March 10, 1970 M. KEMENCZKY 3,500,076
PYROMAGNETIC MOTOR
Filed July 11, 1967
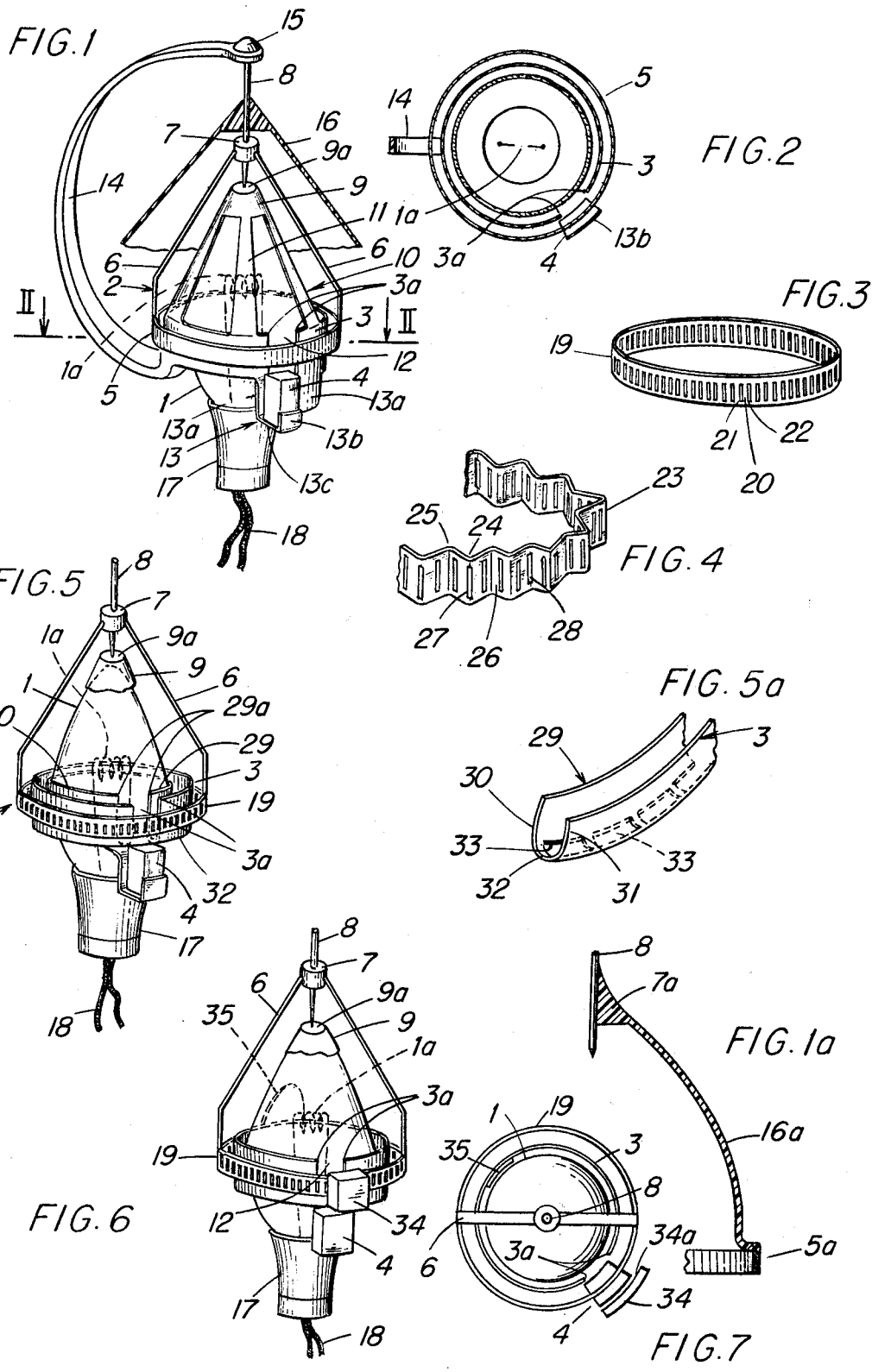

United States Patent Office 3,500,076
Patented Mar. 10, 1970

3,500,076
PYROMAGNETIC MOTOR
Miklos Kemenczky, Point Pleasant Beach, N.J., assignor to Paul Guilden, New York, N.Y.
Filed July 11, 1967, Ser. No. 652,531
Int. Cl. H02n 7/00
U.S. Cl. 310—4
6 Claims

ABSTRACT OF THE DISCLOSURE

A pyromagnetic motor wherein ferromagnetic rotor heating by irradiation is localized and confined to restrict the resulting degradation or reduction of rotor permeability and thereby improve torque. A pyromagnetic motor operated by a radiant energy source and including rotor irradiating means adapted to controllably apply energy to a sector of the rotor portion residing in the magnetic field of the stator and to concentrate such energy upon the irradiated sector. A magnetic permeability differential is established between the irradiated rotor sector and adjacent rotor areas inducing rotor rotation. The motor derives sufficient operating power from an incandescent lamp for rotating ornamental devices.

BACKGROUND OF THE INVENTION

Field of the invention

This invention relates to improved apparatus for converting heat energy into mechanical energy through the agency of a magnetic field. The invention is based on the principle that the permeability of a member of ferromagnetic material decreases upon sufficient heating of the member. The magnetic force of attraction existing between an associated magnet and the member decreases accordingly, giving rise to displacement of the member. More particularly, the invention relates to a low cost, light-weight pyromagnetic motor employing this principle and operating at relatively low temperatures in response to heat energy provided by an infrared radiator, such as a conventional incandescent lamp. In a preferred embodiment of the invention, the pyromagnetic motor derives its motive power from a Christmas tree bulb and causes an ornamental appendage to rotate about the bulb.

Description of the prior art

Pyromagnetic motors generally comprise a rotor element of ferromagnetic material, a rotor heating source, rotor cooling means and a magnet having a field which encloses some rotor area. In the prior art, rotors have taken the form of either simplified disc members or more complicated structures comprising a plurality of apertured laminations or hollow tubes. Motors of the simplified rotor type have employed as the rotor heating source a flame in contact with the rotor element or an electrical heater disposed immediately adjacent the rotor element. In motors employing the more complicated rotor structures, rotor heating is accomplished by conducting heated gases emanating from a furnace through the rotor laminations or tubes. In all such motors a magnet is positioned adjacent the area of the rotor to which heat is applied. The ferromagnetic material of the rotor area is heated to the temperature of the Curie point of the ferromagnetic material and the normally high permeability thereof decreases significantly. As a result, the heated area of the rotor becomes paramagnetic and the magnet attracts that next adjacent area of the rotor which is at a temperature below the temperature of the Curie point, giving rise to rotation of the rotor. However, prior art rotors are heat conductive throughout their mass of ferromagnetic material. Therefore, in order to insure that this lower temperature exists in these next adjacent areas, they incorporate special cooling systems. Even with these systems, a certain amount of heating of adjacent area or heat spillage occurs due to conduction of heat from the heated area, since no provision is made in prior art motors for thermally isolating heated areas from adjacent areas. The prior art pyromagnetic motor is further characterized by the application of heat to a considerable rotor area. In view of this heating of a considerable rotor area which is not precisely defined and the failure to confine applied heat to even this area, the next adjacent areas which lie in the outer portion of the field of the stator magnet receive undesired heating. Since the magnetic force tending to draw these next adjacent areas into the field of the stator magnet is proporional to the permeability of these next adjacent areas, reduced magnetic torque results from this heating.

This shortcoming of the prior art takes on added significance in applications in which it is desirable to make use of a lower temperature heat source, i.e. lower than the temperature of the Curie point of the material. There exist alloys whose magnetic permeability decreases approximately linearly with temperature increase in a temperature range much below the Curie point of the alloy. This is in contrast to prior art motors operating at the Curie point where the permeability change with temperature increase was a step-like change. In these prior art motors, spillage of heat would be somewhat tolerable provided that the cooling system was controlled to cause the hot and cold portions of the rotor to properly straddle the Curie point. However, to permit use of these special alloys in a motor which will operate efficiently at temperatures below the Curie point, it is essential to maintain as large and pronounced a temperature differential as is possible. This requires the controlled application of heat to a defined and restricted rotor area and further the elimination of heat spillage through uncontrolled conduction. In a preferred embodiment of the present invention, such an alloy is employed as the ferromagnetic rotor material. In this case, such localized rotor heating and also confinement of applied heat is introduced in order to maintain the maximum possible temperature differential and therefore maximum torque without resorting to special cooling apparatus.

The motor of the invention in contrast to those of the prior art, lends itself readily to applications involving limitations on rotor heating source capacity, rotor mass and cost. Such applications cannot afford rotor cooling other than that provided passively by the environment. Prior art pyromagnetic motors are characterized by the requirement of active cooling apparatus to withdraw applied heat from the rotors. In the simplified rotor arrangements, the heat sink has taken the form of a roller in direct contact with the rotor disc. In the more complicated rotors, a cooling gas supply is directed through the laminations or tubes as they are rotated away from the magnetic field. This requirement is due presumably to the high mass of the prior art rotors, the absence of any provision of enhance the radiation emitting characteristic of the rotor itself, and the internal dispersion of heat throughout the rotor by conduction.

According to well-known principals the dispersion of heat through the rotor tends to lower the temperature at which the heat is transferred to the cooling medium. This heat transfer is therefore much less efficient than if the heat were confined and the transfer accomplished at a higher temperature.

The state of the art of pyromagnetic motors indicates several shortcomings. The prior art motor sacrifices efficiency by failure to incorporate restricted rotor heating and confinement of such heating. Motors employing the more complicated rotor structures are not capable of use in applications to which the motor of the invention is directed in view of their high mass rotor and the concomitant need for a heating plant in the form of a furnace or the like. These motors are equally limited by their inherent heat retentivity due to the mass of the rotor and must therefrom be equipped with cooling supplies. Motors employing simplified rotors require rotor heating to the Curie temperature and are operative only in combination which intense heat sources such as flames or the like and rotor heat sink devices.

The pyromagnetic motor of the invention is particularly useful in applications which demand a low intensity heat source, a very light rotor, limited space and low cost. These applications prohibit cooling or heat sink apparatus and yet require fast heating and cooling of the rotor in ambient air. In this invention, the shortcomings of the prior art are overcome by: (a) the use of a low mass rotor having ferromagnetic surfaces; (b) controlling degradation of rotor permeability by confining and localizing the heating of the ferromagnetic surfaces of the rotor by (i) providing a plurality of defined rotor sections which are essentially thermally isolated from one another and (ii) shielding from the heating source those rotor sections which are to remain unheated and of higher permeability; (c) treating the surfaces of the rotor to improve its absorption and emission of incident energy; and (d) corrugating the rotor so as to maximize rotor mass lying within the magnetic field while at the same time maintaining a high ratio of surface area to total mass. By reason of these features the pyromagnetic motor of the invention operates efficiently in response to radiant energy emanating from a lower power energy source without active cooling apparatus.

SUMMARY OF THE INVENTION

In the present invention improved pyromagnetic motor performance is accomplished by localizing the thermal degradation of the permeability of a ferromagnetic rotor. To this effect, the rotor comprises a plurality of ferromagnetic elemental sections essentially thermally isolated from one another. One or more of the elemental sections disposed within the field of an associated stator magnet are heated by restricted exposure to a source of radiant energy, thereby decreasing the permeability of the exposed sections. Adjacent unexposed elemental sections within the field of the stator magnet remain unheated and of higher permeability and are rotatively displaced by magnetic attraction into a position of exposure to the radiant energy source. Cyclic degradation and restoration of permeability of successive elemental sections gives rise to sustained rotation of the rotor. Heating of the rotor is accomplished by the use of an infrared radiator as the pyromagnetic motor heat source and infrared shielding is employed to control exposure of elemental sections of the rotor to this radiant energy source and to concentrate energy thereon. All surface area of each rotor elemental section facing the energy source is treated so that the section rapidly absorbs radiant energy when irradiated. Opposite surface area of the section is also treated so that the section readily emits radiant energy and the section is rapidly restored to a higher permeability state after it enters the shadow of the infrared shielding. A corrugated rotor structure further improves motor performance by maximizing rotor mass within the magnetic field, thereby increasing the magnetic force of attraction. The corrugation accomplishes this without decreasing the ratio of surface area to rotor mass and thus without increasing rotor heat retentivity.

An object of the invention is to provide an improved pyromagnetic motor in which energy exchange between the motor heat source and the rotor is controlled to provide localized thermal degradation of rotor permeability.

An additional object of the invention is to provide an improved pyromagnetic motor rotor having reduced internal thermal conductivity.

Another object of the invention is to provide a pyromagnetic motor capable of operating with a rotor the permeability of which varies linearly with temperature over a low temperature range.

A further object of the invention is to provide an improved pyromagnetic motor capable of operating solely in response to radiant energy.

An additional object of the invention is to provide rapid thermal degradation and restoration of permeability in the ferromagnetic rotor of a pyromagnetic motor.

A further object of the invention is to provide an improved pyromagnetic motor operable in limited space, low cost applications involving limited capacity motor heat sources.

The foregoing and other objects, features and advantages of the invention will be apparent from the following more particular description of preferred embodiments of the invention which are illustrated in the accompanying drawings wherein like numerals identify similar parts throughout.

BRIEF DESCRIPTION OF THE DRAWINGS

FIGURE 1 is a perspective view of a pyromagnetic motor constituted in accordance with the principles of the present invention, the motor being used to rotate a display device, portions of the display device being broken away to show constructional details of the motor.

FIGURE 1a is a fragmentary elevational view of a modified form of the pyromotor of FIGURE 1 wherein the display device and the rotor element are fabricated as an integral unit.

FIGUE 2 is a sectional view of the pyromagnetic motor shown in FIGURE 1 as taken along the line II—II.

FIGURE 3 is a perspective view of another form of the rotor which may be employed in the invention.

FIGURE 4 is a fragmentary perspective view of further embodiment of the rotor wherein it has a corrugated structure.

FIGURE 5 is a perspective view of a modified form of the pyromagnetic motor wherein dual shields are employed.

FIGURE 5a is a fragmentary perspective view of a preferred embodiment of the dual shields of FIGURE 5.

FIGURE 6 is a perspective view of a further embodiment of the pyromagnetic motor of the invention.

FIGURE 7 is a top plan view of the pyromagnetic motor shown in FIGURE 6.

DESCRIPTION OF THE PREFERRED EMBODIMENTS

In FIGURE 1 the pyromagnetic motor of the invention is illustrated in its use as a motive power source for a rotary appendage to an incandescent lamp. These appendages, which may typically comprise a colored shade or ornamental display device, have in the past been powered generally by convection motors, wherein the air mass surrounding the incandescent lamp is heated and rises by convection to impinge upon reaction surfaces, thus giving rotation to the display device. Such a turbine operating from a rising column of heated air loses effectiveness when placed in any position other than the one in which it was designed to operate. The motive force of the present invention to the contrary is independent of position. Furthermore, the convection motor, being a turbine, performs poorly under high load low r.p.m. conditions. The pyromagnetic motor, on the other hand, provides higher torque under increasing load as will be discussed hereinafter.

As seen in FIGURE 1 the pyromagnetic motor comprises an incandescent lamp 1 having a filament 1a which radiates infrared energy, a rotor assembly 2, an infrared shield 3 and a stator magnet 4.

Rotor assembly 2 comprises a ferromagnetic rotor element 5 in the form of a continuous thin-walled cylinder or ring, a rotor cage 6 and a hub 7. Hub 7 is fixedly connected to a spindle 8. One end of spindle 8 is supported for rotation by bearing surface 9a of the crown 9 of a shroud 10 which is in turn supported by lamp 1. Shroud 10 further comprises hanger strips 11, which bear on the surface of lamp 1 to clasp the shroud in position on the lamp. Shield 3, which is affixed to and supported by hanger strips 11, consists of a ring having separated ends 3a defining therebetween an exposure window 12. A bracket 13 is connected to shield 3 for supporting stator magnet 4, the bracket comprising sidewalls 13a and 13b and a transverse member 13c. A C-shaped arm 14 is fixedly connected to shield 3 at one end and terminates above the lamp in an upper bearing 15 in which spindle 8 rotates. A display device 16 is fixed to spindle 8 for rotation therewith. Lamp 1, which may be any conventional incandescent lamp, is supplied with excitation through lamp socket 17 and electrical conductors 18.

In operation of the pyromagnetic motor of FIGURE 1, infrared radiations emanating from filament 1a are restrictively applied to that section of rotor 5 which is juxtaposed with exposure window 12. Shield 3 is formed of any suitable material which is opaque to infrared radiation thereby maintaining all unexposed portions of rotor element 5 unheated by virtue of their location in the insulating shadow of the field. In addition to this insulating characteristic, the shield inner surface juxtaposed with the energy source is polished thus reflecting incident infrared radiations back toward their source and concentrating radiations at the exposure window. The outer surface of the shield is also polished so that as the shield becomes heated, the amount of secondary radiation emitted by the shield to the unexposed portions of the rotor is minimized. Rotor 5 is comprised of any ferromagnetic material which exhibits permeability change with temperature below the temperature to which the rotor can be heated by the motor heat source. In the preferred embodiment of FIGURE 1, in which infrared radiations issuing from incandescent lamp constitute the motor heat source, this temperature of the rotor is approximately 105° F. A suitable ferrogamnetic material has been determined to be a 30% nickel-iron alloy which exhibits a linear permeability degradation of one unit upon a temperature increment of about 1.5° F. over the temperature range of 0° to 120° F. in the environment of a magnetic field of 46 oersteds. The inner surface of rotor element 5 is coarse and black in order to achieve fast and efficient heat absorption. The outer surface of the rotor element 5 is likewise matte and black to enhance re-emission of absorbed heat to ambient space. Upon irradiation of the exposed portion of the rotor 5, thermal degradation of the permeability thereof occurs and the material becomes less permeable. As may be noted from FIGURE 1, stator magnet 4 encloses this irradiated section within its field. As a result of the permeability differential between this irradiated section and the adjacent unheated section in the field of the magnet, a resultant force of magnetic attraction between the higher permeability rotor material in the adjacent section and the magnet rotatively displaces the rotor element, thus exposing the adjacent higher permeability section of the rotor to irradiation. The former irradiated and lower permeability section is displaced into the insulating shadow of shield 3 where it is protected from further irradiation. By reason of the coarse and black surfaces of the rotor, absorbed heat is re-emitted to the ambient space. The section cools by radiant emission to space and also by convection with ambient air, and the section is restored to the normal higher permeability state. This cyclic thermal degradation and restoration of rotor permeability provides a sustained rotation of rotor element 5.

As rotor element 5 rotates, like rotation is imparted to spindle 8 which is directly linked to the rotor element through rotor cage 6 and hub 7. Spindle 8 resists lateral displacement by reason of the residence of one end thereof in bearing 15 and the other end in bearing 9a. In this manner any tendency for rotor assembly 2 to tilt under the influence of magnet 4 is resisted. The double bearing arrangement also permits free rotation of the device in any position. Spindle 8 thus drives display device 16 symmetrically about lamp 1.

It will be noted from the preferred embodiment of FIGURE 1 that the pyromagnetic motor depends structurally on lamp 1 only for the support of shroud 10. Thus conventional incandescent lamps of various sizes may be employed to power the motor. The strict spacial relationship of stator magnet 4, rotor element 5 and shield 3 required for operation of the motor is preserved entirely by the mechanical interrelationship of these elements and shroud 10. It is preferable in the manufacture of the motor to fabricate shroud 10, shield 3 and C-shaped arm 14 as a unitary element, e.g. by stamping or molding the assembly from a suitable metal or plastic. In a simplified and special arrangement, rotor cage 6 may be eliminated from the motor structure. In this case, ornament 16a (FIGURE 1a) extends from hub 7a and the lower portion of the ornament is connected to and supports rotor element 5a. To permit cooling of the rotor by convection, apertures may be provided in the lower portion of the ornament.

The torque and rotational speed achieved in the pyromagnetic motor described to this point depend significantly upon the above discussed permeability differential between the adjacent and irradiated rotor sections. Shield 3 functions to permit restoration of higher permeability in the adjacent section as does the rotor element emission characteristic. To improve this permeability differential, the improved rotor structure shown in FIGURE 3 may be employed in place of rotor element 5 of FIGURE 1.

Rotor 19 of FIGURE 3 comprises a ring of ferromagnetic material which is subdivided into a plurality of elemental sections 20 defined by slits 21 and 22 which constitute minute openings in the rotor. Alternatively, the rotor may be comprised of a thin-walled ring of low heat conductivity having elemental areas of ferromagnetic material disposed therein. Basically, this improved rotor defines a structure in which elemental ferromagnetic areas are in substantial thermal isolation from one another. As in the rotor of FIGURE 1, the elemental areas are coarse and black to provide fast absorption and re-emission of absorbed heat. By virtue of this thermal isolation, transfer of heat by conduction within the rotor is minimized with the result that only the exposed irradiated area of the rotor element 19 undergoes heating. Degradation of permeability in the adjacent section due to conduction of heat from the irradiated sections, which necessarily occurs to some extent in the rotor element 5 of FIGURE 1, is substantially reduced. The permeability differential in the rotor 19 is thus of greater magnitude than that of rotor 5 and provides an increased force of magnetic attraction. As a result torque and rotor angular velocity improve and load capacity increases. It should be noted that load capacity or torque rises under increasing load since slower rotation under load lengthens the heating and cooling portions of the cycle of operation. Limiting the spread of heat by conduction also facilitates air cooling as it tends to maintain a higher temperature differential between each heated section and ambient space and therefore a more rapid emission of absorbed heat.

A further improved rotor structure is shown in FIGURE 4. Here rotor 23 is a corrugated version of rotor 19 having ridges 24 and grooves 25 along with slits 27 and 28, adjacent slits defining elemental areas 26. When such a structure is employed in place of rotor 5 in the motor of FIGURE 1, the rotor mass lying within the field of stator magnet 4 is increased considerably giving rise to greater forces of magnetic attraction. This is accomplished without an accompanying increase in the thickness of the rotor which would decrease the ratio of surface area to total mass. This ratio is of concern in the pyromagnetic motor of the invention since the rapidity of heating and cooling is directly proportional to the ratio. On the other hand, the torque of any pyromagnetic motor is proportional to rotor mass within the magnetic field. In rotor 23 mass is increased without adversely affecting the rapidity of heating and cooling the rotor. Thus rotor 23 operates with the efficiency of rotor 19 of FIGURE 3 and with increased torque and rotational velocity.

Referring to FIGURE 5 a further embodiment of the pyromagnetic motor of the invention is shown with certain of the support structure of FIGURE 1 removed for clarity. Here an additional infrared radiation shield 29 is interposed between shield 3 and incandescent lamp 1. A preferred embodiment of the dual shield is shown in FIGURE 5a and comprises a trough-shaped ring having an inner wall 30 and an outer wall 31 connected together by an arcuate base 32. The wall 30 constitutes inner shield 29 (FIGURE 5) and the wall 31 constitutes outer shield 3. Spaced apart slotted openings 33 are formed in arcuate base 32 to permit passage of cooling ambient air between shields. Referring again to FIGURE 5, the separated ends 3a and 29a of the shields are aligned to define exposure window 12 which provides restricted irradiation of rotor element 19. This dual shield arrangement provides increased protection of unexposed elemental areas 20 of rotor 19 from infrared radiation emanating from filament 1a.

A further embodiment of the subject pyromagnetic motor is shown in FIGURES 6 and 7. In this version reflectors are added to the pyromagnetic motor structure to maximize irradiation of elemental areas 20 of rotor 19 which are exposed to infrared radiation. A mirror 34 having a reflective surface 34a is supported in a position of alignment with filament 1a and exposure window 12. The mirror 34 preferably extends above and below the rotor element 19 to collect primary infrared radiation passing over rotor 19 and secondary radiation emanating from the matte and black outer surface of the rotor itself. The reflective surface 34a is so designed to reflect such radiation on the exterior side of the rotor thereby accelerating thermal degradation of permeability in the exposed elemental areas. A further reflective element 35 is positioned on shield 3 at a location which is reciprocal to that of exposure window 12 defined by shield ends 3a, i.e. the center of reflector 35 is approximately 180° from the center of the exposure window. This reflector is designed to redirect incident infrared radiation on to the exposed elemental areas 20 of rotor 19 for the purpose of further increasing thermal degradation of permeability of the exposed rotor elemental areas. Reflector 35 may be formed in any convenient manner such as by enlarging the polished inner surface of shield 3 locally at the area as is shown in FIGURE 6. Suitable support means such as have been shown in FIGURE 1 may be provided for reflector 34, the only requirement for such support being that a fixed spatial relationship exist between the shield 3, stator magnet 4 and reflector 34.

While the subject invention has been shown in the particular application of providing motive power for a display device appended to an incandescent lamp, the invention lends itself readily to providing rotary motive power for toys, mobile advertisements or the like. In this connection, it should be noted that any form of infrared radiator may be employed as the heat source for the pyromagnetic motor, such as sunlight or the like, provided that it is capable of irradiating the rotor sufficiently to increase the temperature thereof to cause degradation of rotor permeability. Moreover, the invention contemplates the usage of any radiant energy capable of degrading the permeability of a ferromagnetic material. While the radiant energy source has been shown in the illustrated embodiment in a position within the pyromagnetic motor, by appropriate rearrangement of the shield 3 externally of rotor element 5, the source may be positioned externally of the motor. The shield structure itself may be greatly simplified in certain applications by applying shielding coatings directly to the radiant energy source. A radiant energy source having an output characteristic such that no divergence exists in radiations emanating from the source (e.g. a simple optical system or laser) will permit elimination of the shield from the motor structure itself. In such cases, the required localization of thermal degradation of permeability is accomplished in the radiator itself.

While the invention has been particularly shown and described with reference to preferred embodiments thereof, it will be understood by those skilled in the art that various changes in form and detail may be made without departing from the spirit or scope of the invention.

What is claimed is:
1. A pyromagnetic motor comprising:
  (a) a rotor having an encircling ferromagnetic surface in free thermal communication with ambient air;
  (b) a stator magnet having a magnetic field which encloses a portion of said ferromagnetic surface;
  (c) a source emitting radiant energy; and
  (d) radiant energy shielding means receiving said source energy and controlling application thereof to said rotor to concentrate said energy on a sector of said portion of said ferromagnetic surface for decreasing the magnetic permeability of said sector, thereby establishing a permeability differential between said sector and the remainder of said portion inducing rotation of said rotor.
2. The pyromagnetic motor of claim 1, wherein said ferromagnetic surface comprises a plurality of elemental ferromagnetic sections, adjacent elemental sections being substantially in thermal isolation from one another.
3. A pyromagnetic motor comprising:
  (a) a cylindrical rotor having an encircling ferromagnetic surface in free thermal communication with ambient air;
  (b) a stator magnet having a magnetic field which encloses a portion of said ferromagnetic surface;
  (c) a source emitting radiant energy; and
  (d) means for controlling application of said radiant energy to said rotor to concentrate said energy on a sector of said portion of said ferromagnetic surface for decreasing the magnetic permeability of said sector, thereby establishing a permeability differential between said sector and the remainder of said portion inducing rotation of said rotor; said ferromagnetic surface containing a plurality of openings extending between the ends of said cylinder, the surfaces between adjacent openings constituting elemental ferromagnetic sections substantially in thermal isolation from one another.
4. A pyromagnetic motor comprising:
  (a) a rotor having an encircling ferromagnetic surface in free thermal communication with ambient air;
  (b) a stator magnet having a magnetic field which encloses a portion of said ferromagnetic surface;
  (c) a source emitting radiant energy; and
  (d) means for controlling application of said radiant energy to said rotor to concentrate said energy on a sector of said portion of said ferromagnetic surface for decreasing the magnetic permeability of said sector, thereby establishing a permeability differential between said sector and the remainder of said portion inducing rotation of said rotor, said means comprising a shield disposed between said source and said rotor, the shield surface facing said source having a part reflective to radiations emanating from said source and a part non-reflective to such radiations, said non-reflective part registering with said sector.
5. The pyromagnetic motor of claim 4, wherein the outer surface of said shield comprises a part reflective to radiant energy and a part non-reflective to such radiation, said non-reflective part registering with said sector.
6. The pyromagnetic motor of claim 4, including a radiant energy reflector disposed exteriorly of said rotor and facing said non-reflective part of said shield.

References Cited

UNITED STATES PATENTS

| | | | |
|---|---|---|---|
| 2,222,425 | 11/1940 | Wehe | 322—2 X |
| 2,656,630 | 10/1953 | McDonald | 40—33 X |
| 476,983 | 6/1892 | Edison | 310—4 |
| 1,431,545 | 10/1922 | Schwartz | 310—4 |
| 1,716,091 | 6/1929 | Schwartz | 310—4 |
| 3,198,969 | 8/1965 | Kolm et al. | 310—4 |

FOREIGN PATENTS

| | | |
|---|---|---|
| 378,881 | 2/1940 | Italy. |
| 16,709 | 4/1888 | Great Britain. |

D. F. DUGAN, Primary Examiner